(12) United States Patent
Larsson et al.

(10) Patent No.: US 11,072,335 B2
(45) Date of Patent: Jul. 27, 2021

(54) METHOD FOR CONTROLLING A VEHICLE

(71) Applicant: VOLVO TRUCK CORPORATION, Gothenburg (SE)

(72) Inventors: Johan Larsson, Uddevalla (SE); Anders Eriksson, Torslanda (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 106 days.

(21) Appl. No.: 16/479,991

(22) PCT Filed: Jan. 31, 2017

(86) PCT No.: PCT/EP2017/052023
§ 371 (c)(1),
(2) Date: Jul. 23, 2019

(87) PCT Pub. No.: WO2018/141360
PCT Pub. Date: Aug. 9, 2018

(65) Prior Publication Data
US 2019/0367028 A1  Dec. 5, 2019

(51) Int. Cl.
*B60W 30/188* (2012.01)
*B60W 10/06* (2006.01)
(Continued)

(52) U.S. Cl.
CPC .......... *B60W 30/188* (2013.01); *B60W 10/06* (2013.01); *B60W 10/11* (2013.01);
(Continued)

(58) Field of Classification Search
CPC ......... B60W 30/188; B60W 30/18172; B60W 10/06; B60W 10/11; B60W 10/18;
(Continued)

(56) References Cited

U.S. PATENT DOCUMENTS 5,875,410 A * 2/1999 Fowler .................. B60W 10/06
477/78
6,066,071 A   5/2000 Janecke et al.
(Continued)

FOREIGN PATENT DOCUMENTS

GB     2523321 A    8/2015
WO     03/038314 A1 5/2003
(Continued)

OTHER PUBLICATIONS

International Search Report and Written Opinion in International Application No. PCT/EP2017/052023, dated Oct. 17, 2017.

*Primary Examiner* — Huan Le
(74) *Attorney, Agent, or Firm* — Venable LLP; Jeffri A. Kaminski

(57) ABSTRACT

The invention provides to a method for controlling a vehicle (1) with an internal combustion engine (2) and a transmission (3), the transmission being arranged to automatically provide shifts between a plurality of gear ratios between the engine and at least one driven wheel (5) of the vehicle, characterized by the steps of: —registering (S1, S108) a decrease of a demanded torque from an engine control input device (8) of the vehicle, —controlling (S2, S109) in response to the demanded torque decrease the rotational speed of the engine so as to not be below a rotational speed threshold value which is above an idle speed of the engine, and where said rotational speed threshold value is determined so as for a transmission gear down shift to be avoided.

21 Claims, 3 Drawing Sheets

(51) Int. Cl.
*B60W 10/11* (2012.01)
*B60W 10/18* (2012.01)
*B60W 30/18* (2012.01)

(52) U.S. Cl.
CPC ...... *B60W 10/18* (2013.01); *B60W 30/18172* (2013.01); *B60W 2300/12* (2013.01); *B60W 2510/0657* (2013.01); *B60W 2530/10* (2013.01); *B60W 2552/15* (2020.02); *B60W 2710/0644* (2013.01); *B60W 2710/10* (2013.01); *B60W 2710/18* (2013.01)

(58) Field of Classification Search
CPC ......... B60W 2552/15; B60W 2300/12; B60W 2510/0657; B60W 2530/10; B60W 2710/0644; B60W 2710/10; B60W 2710/18
See application file for complete search history.

(56) References Cited

U.S. PATENT DOCUMENTS

| | | | |
|---|---|---|---|
| 2005/0245351 A1* | 11/2005 | Yamada | B60W 10/06 477/110 |
| 2007/0082784 A1* | 4/2007 | Walker | B60W 10/11 477/107 |
| 2010/0004094 A1 | 1/2010 | Shiiba et al. | |
| 2011/0190993 A1 | 8/2011 | Eriksson et al. | |
| 2011/0251765 A1 | 10/2011 | Gentile et al. | |
| 2012/0271524 A1* | 10/2012 | Eriksson | B60W 10/11 701/93 |
| 2013/0296103 A1 | 11/2013 | Dai et al. | |

FOREIGN PATENT DOCUMENTS

| | | |
|---|---|---|
| WO | 2007/030045 A1 | 3/2007 |
| WO | 2010/124764 A1 | 11/2010 |
| WO | 2015/124596 A1 | 8/2015 |

* cited by examiner

METHOD FOR CONTROLLING A VEHICLE

TECHNICAL FIELD

The invention relates to a method for controlling a vehicle with an internal combustion engine and a transmission, the transmission being arranged to automatically provide shifts between a plurality of gear ratios between the engine and at least one driven wheel of the vehicle. The invention also relates to a computer program, a computer readable medium, a control unit and a vehicle.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

It is known to adapt a gear change strategy to changing conditions. This is particularly useful for heavy duty vehicles, for which unwanted stops in a difficult surrounding may cause problems to the operator of the vehicle. US20110190993 describes the possibility to choose a suitable driving mode when driving in a severe condition, such as on a soft surface. This mode may provide an increased driving force in order to avoid the vehicle stopping.

However, there is a desire to further reduce the risk of unwanted vehicle stops, e.g. on roads in poor conditions or in steep uphill road sections. If road traction is limited a restart might not be possible, and towing or reversing may be the only possible options, which may both be highly unwanted for heavy duty vehicles, in particular tractor and trailer combinations.

SUMMARY

An object of the invention is to avoid unwanted vehicle stops. An object of the invention is to avoid unwanted vehicle stops in challenging conditions such as on steep uphill road sections.

The object is achieved by a method according to claim 1. Thus, the invention provides a method for controlling a vehicle with an internal combustion engine and a transmission, the transmission being arranged to automatically provide shifts between a plurality of gear ratios between the engine and at least one driven wheel of the vehicle, characterized by the steps of:
  registering a decrease of a demanded torque from an engine control input device of the vehicle,
  controlling in response to the demanded torque decrease the rotational speed of the engine so as to not be below a rotational speed threshold value which is above an idle speed of the engine, and where said rotational speed threshold value is determined so as for a transmission gear down shift to be avoided.

It is understood that the transmission may be arranged to automatically provide shifts between any suitable number of gear ratios, e.g. twelve where the vehicle is a heavy duty vehicle. The transmission may be permanently automatic or selectively automatic; in the latter case, the transmission may be in an automatic mode when the method according to the invention is carried out. The driver input device may be e.g. an accelerator pedal. The registration of the decrease of the demanded torque from the driver input device may be due to the accelerator pedal being partly or fully released. The rotational speed threshold value may be constant and predetermined. The rotational speed threshold value may be any suitable value, e.g. 1200 rpm, which is above the idle speed of the engine, which may be e.g. 600 rpm. Alternatively, as exemplified below the rotational speed threshold value may be adjusted based on certain operational parameters.

The invention provides an effective way of avoiding unwanted downshifts and thereby unwanted vehicle stops in critical situations. When a driver of the vehicle releases, e.g. by mistake, the accelerator pedal, partly or fully, the engine speed is limited downwards to a value, the rotational speed threshold value, which may be well above the engine idle speed. Thereby a relatively high torque of the engine may be retained despite the accelerator pedal release. At engine speeds above the rotational speed threshold value the driveline may be kept engaged so that traction is ensured. This provides an important improvement for driving heavy duty vehicles in difficult conditions, e.g. due to steep uphill inclinations and/or poor condition roads and bad roads. The invention provides for avoiding an unwanted transmission downshift where the driver releases the accelerator pedal. e.g. by mistake or for adjusting the vehicle speed. Thereby a vehicle standstill may be avoided, which otherwise may result in the need for towing or reversing the vehicle.

Preferably, said control of the engine rotational speed so as to not be below the rotational speed threshold value is dependent on an inclination of the road on which the vehicle is travelling. For example, the step of controlling the engine rotational speed so as to not be below the rotational speed threshold value may be omitted or terminated if the road inclination is below an inclination threshold value. Thereby, the control of the engine rotational speed so as to not be below the rotational speed threshold value may be activated in a situation in which it is particularly needed, e.g. in a steep road inclination, but it may be avoided in other situations where it might not be needed, e.g. where the road is flat. It should be noted that herein, road inclination, or positive road inclination, refers to an uphill road inclination.

In some embodiments, the method comprises determining the rotational speed threshold value in dependence on an inclination of a road on which the vehicle is travelling. For example, the rotational speed threshold value may be increased with an increasing road inclination. The inclination may be determined by means of an inclination sensor. Thereby, the threshold for the engine speed may be effectively adapted to the degree of inclination. Thereby, an unnecessarily high engine rotational speed may be avoided where it is not needed for the function of the control of the engine rotational speed so as to not be below the rotational speed threshold value to avoid unwanted vehicle stops, e.g. in relatively moderate road inclinations.

In some embodiments, the rotational speed threshold value may go towards the engine idle speed with a decreasing road inclination towards a level road. It should be noted that thereby values of the rotational speed threshold relatively close to the engine idle speed, may not be determined so as for a transmission gear down shift to be avoided upon a demanded torque decrease. In such embodiments, as the inclination increases, the rotational speed threshold value increases as well. Thereby, at relatively high inclinations, the values of the rotational speed threshold are such that a transmission gear down shift is avoided upon a demanded torque decrease. Further, as the inclination increases, the rotational speed threshold value may go towards the rotational speed at the maximum torque of the engine, i.e. the torque plateau value.

Preferably, said control of the engine rotational speed so as to not be below the rotational speed threshold value is dependent on the weight of the vehicle. For example, the rotational speed threshold value may be determined in dependence on the weight of the vehicle. Thereby, the function of the control of the engine rotational speed so as to not be below the rotational speed threshold value to avoid vehicle unwanted vehicle stops may be adapted to the need for it based on the weight of the vehicle. An increased vehicle weight may increase the need for the function. Thereby, at relatively high vehicle weights, the values of the rotational speed threshold are preferably such that a transmission gear down shift is avoided upon a demanded torque decrease. However, a decreased weight, e.g. due to a preceding vehicle unloading process, may reduce the need for the function. Thereby, values of the rotational speed threshold may be relatively close to the engine idle speed, and may not be determined so as for a transmission gear down shift to be avoided upon a demanded torque decrease.

As exemplified below, where the vehicle comprises an air suspension system, the weight of the vehicle may be determined based on a determined pressure in the air suspension system. Alternatively, the method may comprise determining an acceleration of the vehicle, determining a value of a parameter indicative of a torque of the engine, and determining the weight of the vehicle based on the determined acceleration and the determined engine torque indicative parameter value. In the latter case, Newton's second law may be used.

Advantageously, the method comprises enabling in dependence on an operational condition of the vehicle the control of the engine rotational speed so as to not be below the rotational speed threshold value. Thereby, the control of the engine rotational speed so as to not be below the rotational speed threshold value may be activated when particularly useful due to an operational condition, but it may be kept inactivated in absence of any significant usefulness of it.

The operational condition may be a manipulation of a driver control input device. Thereby, the control of the engine rotational speed so as to not be below the rotational speed threshold value may be activated manually by a driver of the vehicle.

The operational condition may be that the transmission is in an off-road gear strategy mode. Thereby, the control of the engine rotational speed so as to not be below the rotational speed threshold value may be activated while the vehicle is travelling through an environment with difficult conditions, whereby said control may be particularly useful for preventing unwanted stops of the vehicle.

The operational condition may be an indication of an increased tendency for a wheel of the vehicle to slip. Thereby, e.g. where the vehicle is travelling on a surface providing poor traction, e.g. a surface of gravel, mud, snow or ice, the control of the engine rotational speed so as to not be below the rotational speed threshold value may be activated to assist in avoiding an unwanted vehicle stop. The control of the engine rotational speed so as to not be below the rotational speed threshold value may be activated manually by a driver of the vehicle, or automatically, e.g. by detecting the tendency for a wheel to slip by comparing input from a wheel speed sensor with information about the vehicle speed.

Preferably, the method comprises activating a driver alert signal upon enabling the control of the engine rotational speed so as to not be below the rotational speed threshold value. Thereby it may be ensured that a driver of the vehicle is informed about the activation of the function of the control of the engine rotational speed so as to not be below the rotational speed threshold value.

Preferably, the rotational speed threshold value is determined in dependence on a maximum torque of the engine. Thereby the minimum rotational speed allowed may be relatively low at a relatively high maximum engine torque, and vice versa. A relatively low maximum engine torque may entail an increased tendency for the vehicle to stop upon a decrease of the demanded torque from the engine control input device. Thereby a relatively high rotational speed threshold value may ensure that the control of the engine rotational speed so as to not be below the rotational speed threshold value will prevent a vehicle stop, e.g. on an inclined road section.

Preferably, the method comprises registering, upon the registration of the decrease of the demanded torque, a request by a vehicle driver transmission control input device to perform a transmission gear down shift, and controlling the transmission so as to obtain the requested transmission gear down shift. Thereby, the control of the engine rotational speed so as to not be below the rotational speed threshold value, for a transmission gear down shift to be avoided, may be aborted where it is registered that the driver requests a gear down shift. The request by the vehicle driver transmission control input device may be based on a driver manipulation of the transmission control input device, whereby the driver may override an automatic gearshift strategy of the transmission.

Preferably, the method comprises by registering, upon the registration of the decrease of the demanded torque, a request to activate at least one wheel brake of the vehicle, and, upon the registration of the wheel brake activation request, omitting or terminating the step of controlling the engine rotational speed so as to not be below the rotational speed threshold value. Thereby, the control of the engine rotational speed so as to not be below the rotational speed threshold value, for a transmission gear down shift to be avoided, may be aborted where it is registered that the driver requests a reduction of the vehicle speed by the wheel brake activation request.

Preferably, the method comprises registering, upon the registration of the decrease of the demanded torque, an activation of a kickdown function of the engine control input device, and, upon the registration of the kickdown function activation, controlling the transmission so as to obtain a transmission gear down shift. Thereby, the control of the engine rotational speed so as to not be below the rotational speed threshold value, for a transmission gear down shift to be avoided, may be aborted where it is registered that the driver requests a gear down shift by means of the kickdown function, as exemplified below.

The objects are also reached with a computer program according to claim 18, a computer readable medium according to claim 19, a control unit according to claim 20, or a vehicle according to claim 21.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
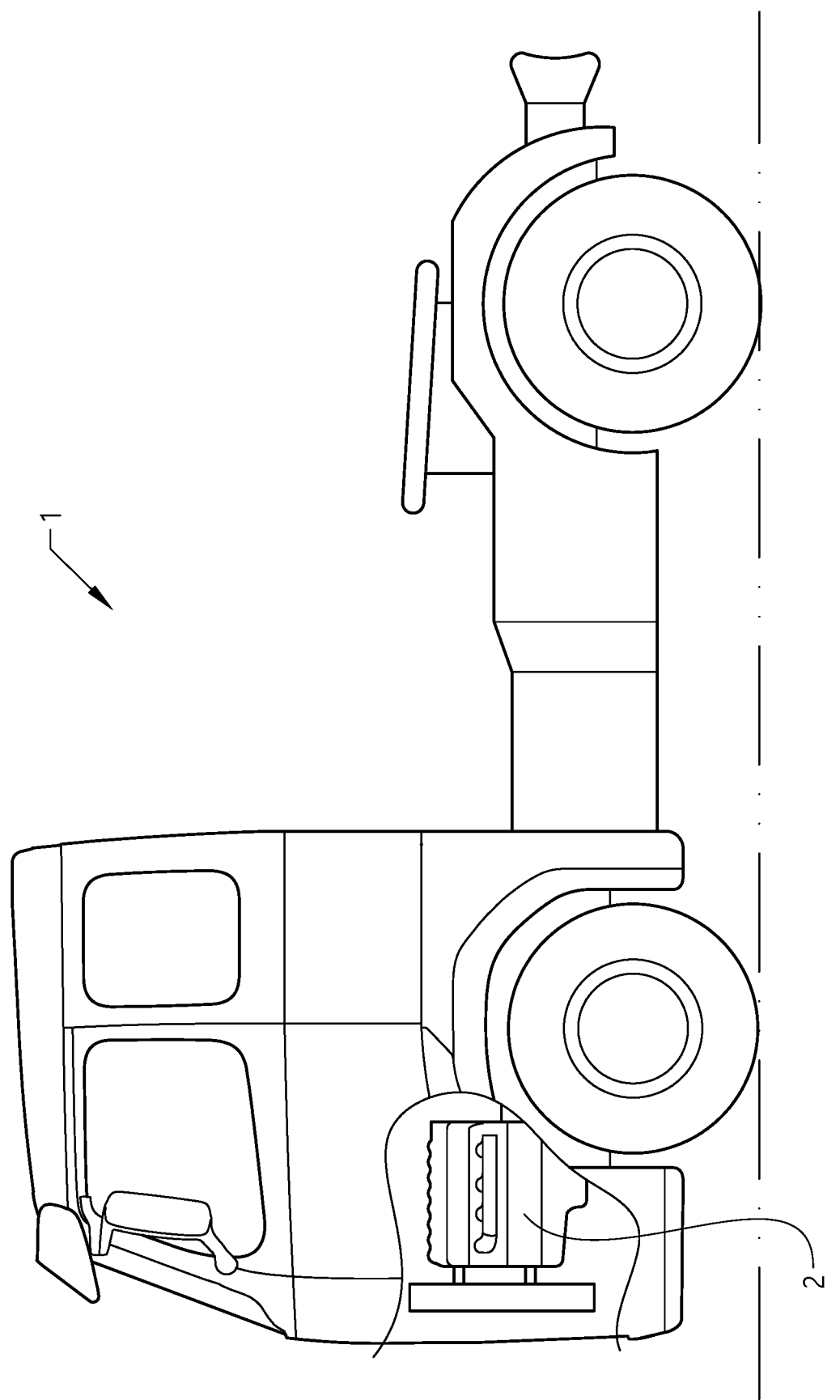
FIG. 1 is a partially sectioned side view of a vehicle in the form of a truck.

FIG. 1 shows a vehicle 1 in the form of a truck in a partly cut side view. More specifically, in this example the truck is a tractor unit for a semi-trailer. The vehicle 1 has an internal combustion engine 2 in the form of a diesel engine for the propulsion of the vehicle 1. It should be noted that the invention is equally applicable to vehicles with other types of engines, e.g. Otto engines. Also, the invention is equally applicable to other types of vehicles, such as other types of trucks, or buses or cars.

Figure 2:
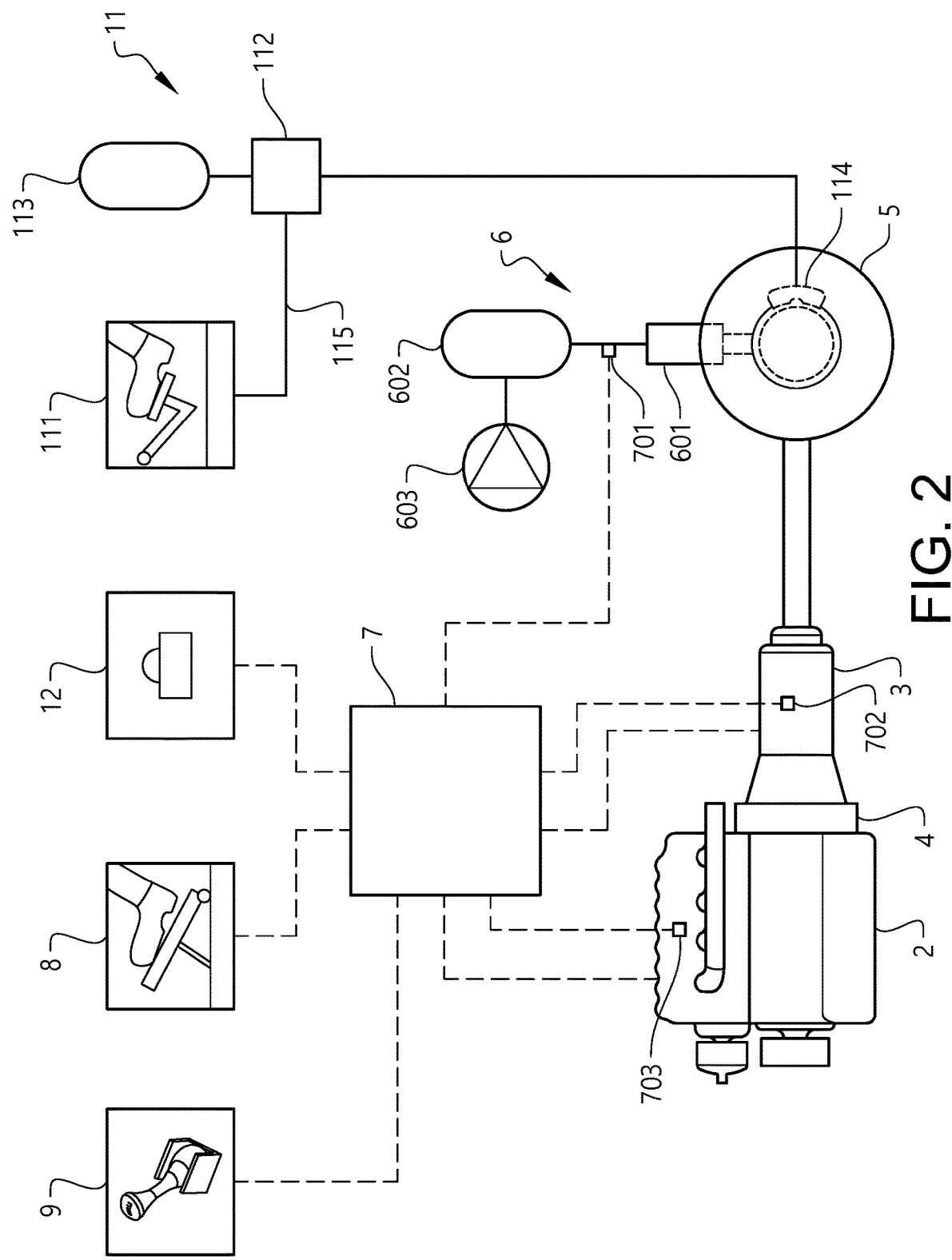
FIG. 2 depicts components in the vehicle in FIG. 1, including an internal combustion engine and a transmission.

FIG. 2 shows further components in the vehicle. Besides the engine 2, a driveline of the vehicle comprises a transmission 3 and a clutch 4 between the engine 2 and the transmission 3. The transmission 3 is an automatic transmission.

The vehicle also comprises an air suspension system 6 for suspension of a chassis (not shown) of the vehicle from wheels 5 of the vehicle. The air suspension system comprises air springs 601 at the wheels 5, arranged to be fed from an accumulator 602, arranged to be fed in turn by a compressor 603.

The vehicle further comprises a control unit 7 for controlling the engine 2 and the transmission 3 as exemplified below. The control unit 7 may be provided as a single physical unit, or as a plurality of physical unit arranged to communicate with each other.

The control unit 7 is arranged to receive signals from an engine control input device 8 in the form of an accelerator pedal arranged to be manipulated by a driver of the vehicle. The signals from the engine control input device 8 are indicative of a demanded torque of the engine 2. The control unit 2 is arranged to control the engine 5, e.g. a fuel system thereof, so as to control the engine output torque in response to the demanded torque. Thereby, the control unit 7 is arranged to also control the rotational speed of the engine 2.

The control unit is also arranged to receive signals indicative of the rotational speed of the engine. Said signals are received from a rotational speed sensor 703 at a crankshaft (not shown) of the engine.

The control unit 7 is also arranged to receive signals from a vehicle driver transmission control input device 9 in the form of a gear lever arranged to be manipulated by the driver of the vehicle. The signals from the transmission control input device 9 are indicative of a demanded setting of the transmission 3, selected from a plurality of settings including a neutral setting, a forward drive setting, a reverse drive setting, and a parking setting. The control unit 2 is arranged control the transmission 3 so as to provide the demanded setting.

When the transmission 3 is in the forward drive setting, the transmission 3 is arranged to automatically provide shifts between a plurality of gear ratios between the engine 2 and driven wheels 5 of the vehicle. Said gear shift are at least partly dependent on the rotational speed of the engine. The gear ratios are the ratio between the rotational speed of the engine and the rotational speed of an output shaft of the transmission. Generally, as the rotational speed of the engine increases up to a certain speed the transmission gear is shifted so as to provide a higher gear ratio. As the rotational speed of the engine decreases down to a certain speed the transmission gear is shifted so as to provide a lower gear ratio.

Further, the transmission 3 is arranged to provide said shifts between the gear ratios in dependence of a selected gear strategy mode. By means of the transmission control input device 9 the may select a gear strategy mode from a plurality of gear strategy modes. In this example the gear shift strategies include a cruising gear strategy mode, and an off-road gear strategy mode. The cruising gear strategy mode is adapted to vehicle travel on a normal road with moderate maximum inclinations. The off-road gear strategy mode is adapted to vehicle travel in off-road conditions, or other conditions where demands on the engine and transmission are higher than on a normal road. The off-road gear strategy mode is adapted to conditions with relatively high maximum inclinations. The off-road gear strategy mode may involve up-shifting of gears at a higher engine speed than the cruising gear strategy mode.

In addition, when the transmission 3 is in the forward drive setting, signals from the transmission control input device 9 may be indicative of a desired gear shift based on a driver manipulation of the transmission control input device 9. I.e., the driver may override the automatic gearshift strategy of the transmission 3.

The engine control input device 8 has a kickdown function. The kickdown function means that when the accelerator pedal 8 is depressed, the control unit 7 controls the transmission so as to perform a transmission gear down shift.

The control unit 7 is further arranged to determine an air suspension system pressure by means of signals received from a pressure sensor 701 at the air suspension system 6.

The control unit 7 is also arranged to determine an attitude of the vehicle 1, to thereby determine an inclination of a road of which the vehicle is travelling. For this the control unit is arranged to receive signals from an inclination sensor 702 provided in the transmission 3. It is understood that the inclination sensor 702 could be provided in any other suitable location in the vehicle 1.

The vehicle comprises an air wheel brake system 11, comprising a brake control input device 111, in the form of a brake pedal arranged to be manipulated by the driver. The brake pedal 111 is arranged to adjust, by a mechanical linkage 115, a valve arrangement 112, in turn arranged to control the admission of air from an air accumulator 113 to brakes 114 at the wheels 5.

A control action by means of the brake pedal 111 and the mechanical linkage 115 to adjust the valve arrangement 112 is herein also understood as a request from the brake pedal 111 to activate the wheel brakes 114. The control unit 7 is arranged to receive signals from the brake control input device 111, indicative of a request to activate the wheel brakes 114.

Figure 3:
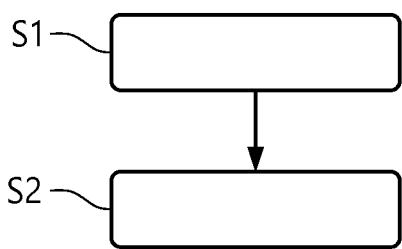
FIG. 3-FIG. 4 depict steps in methods according to alternative embodiments of the invention.

Reference is made also to FIG. 3. In an embodiment of the method according to the invention the control unit registers S1 a decrease of a demanded torque from the engine control input device 8. In response to the demanded torque decrease the control unit 7 controls in S2 the rotational speed of the engine so as to not be below a rotational speed threshold value which is above an idle speed of the engine. The rotational speed threshold value is determined so as for a transmission gear down shift to be avoided. Thereby, a transmission gear downshift may be avoided despite the demanded torque decrease.

Figure 4:
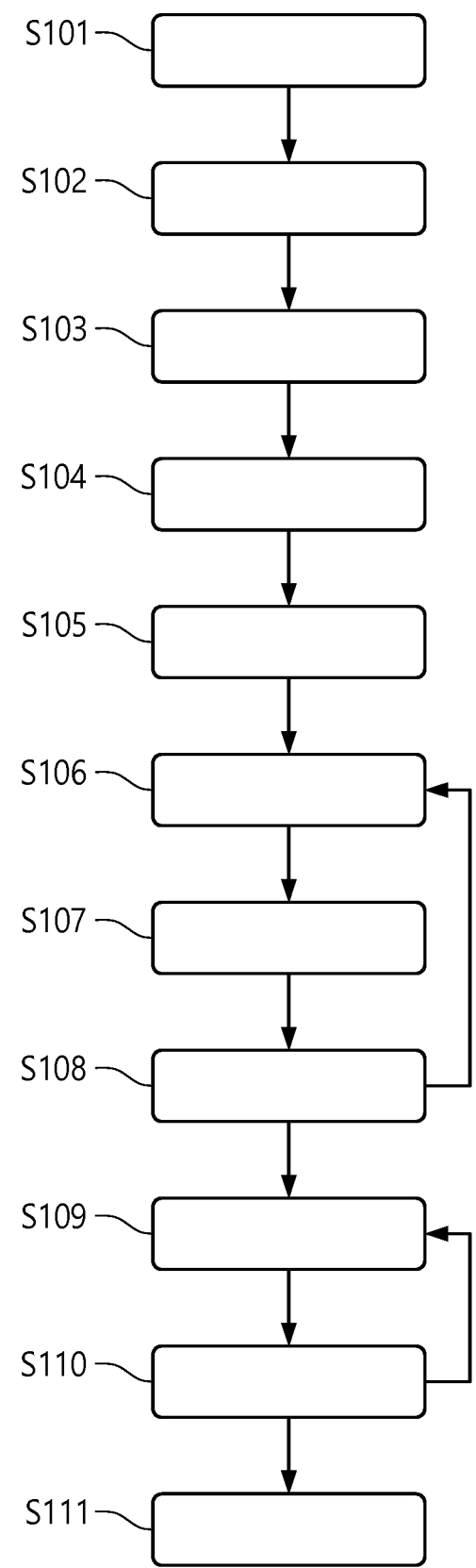

Reference is made also to FIG. 4. A further embodiment of the method according to the invention comprises determining S101 whether the transmission is in the off-road gear strategy mode upon a manipulation of the transmission control input device 9. The off-road gear strategy mode is in this embodiment an operational condition which enables a function described below in which the engine rotational speed is controlled so as to not be below a rotational speed threshold value.

When the transmission is in the off-road gear strategy mode a driver alert signal is activated S102. The driver alert signal is provided as an illumination of a lamp 12 illustrated in FIG. 2.

Upon entering the off-road gear strategy mode, the maximum torque of the engine 2 is determined S103. The maximum engine torque, used as described below, may be determined by the control unit 7 by access to a data storage (not shown).

The method further comprises determining S104 by means of the pressure sensor 701 the pressure in the air suspension system 3. Based on the determined pressure the weight of the vehicle, used as described below, is determined S105. It should be noted that where the vehicle is connected to a trailer, e.g. a semi-trailer, preferably the weight determination includes determining the weight of the combination of the vehicle and the semi-trailer. The weight determination S105 is performed continuously or repetitively to update the weight information as circumstances, e.g. load and fuel amount, change.

The method further comprises determining S106 an inclination of a road on which the vehicle is travelling. This is done by means of the inclination sensor 702. The road inclination determination S106 is performed continuously or repetitively to update the road inclination information as the road inclination changes.

In addition, the method comprises determining S107 rotational speed threshold value, to be used as described below. The rotational speed threshold value is determined partly based on the road inclination determined by means of the inclination sensor 702. More specifically, the rotational speed threshold value increases with an increasing road inclination. The rotational speed threshold value may increase gradually with an increasing road inclination. It should be noted that herein, road inclination refers to an uphill road inclination.

In addition, the rotational speed threshold value is determined partly based on the weight of the vehicle, in turn determined S105 as described above. An increased weight contributes to increasing the rotational speed threshold value. The rotational speed threshold value is also determined partly based on the maximum torque of the engine, in turn determined S103 as described above. A relatively high maximum engine torque will contribute to a relatively low rotational speed threshold value. More generally, where there is a positive road inclination, the rotational speed threshold value is determined so as for a transmission gear down shift to be avoided if the engine rotational speed is above the rotational speed threshold value.

The rotational speed threshold value determination S107 is performed continuously or repetitively to update the rotational speed threshold value as the road inclination and the vehicle weight change. In this example, for all vehicle weights, and for all engine maximum torques, when the road inclination is zero, i.e. when the road is flat, or negative, i.e. when the vehicle travels downhill, the rotational speed threshold value is equal to an idle speed of the engine.

The method also comprises continuously or repetitively determining S108 whether the demanded torque, as registered from the engine control input device 8, is decreased. If a decrease of the demanded torque is registered S108, the engine is controlled S109 by the control unit 7 so that the rotational speed of the engine does not fall below the rotational speed threshold value.

As understood, since on a flat road the rotational speed threshold value is equal to the idle speed, the method described here does not affect the engine and transmission control on a flat road. However, when the road has a positive inclination, i.e. when the vehicle is travelling uphill, the engine will not be allowed to reach idle speed, since the rotational speed threshold value is above the idle speed. In addition, since the rotational speed threshold value is determined so as for a transmission gear down shift to be avoided, and the rotational speed of the engine is controlled so as to not fall below the rotational speed threshold value, the engine is controlled so that a transmission gear down shift is avoided.

Thereby, a situation may be avoided where the vehicle when travelling up a steep part of a road, stops due to a temporary release of the acceleration pedal 8 followed by a gear downshift according to the transmission gear strategy mode. Taking the vehicle out of such a situation may be difficult, especially where the vehicle has a semi-trailer connected to it, and the combination thereof is heavy.

However, if upon the registration S108 of the decrease of the demanded torque, a request by the transmission control input device 9 to perform a transmission gear down shift is registered S110, the transmission controlled S111 so as to obtain the requested transmission gear down shift. Thus, if the driver requests a gear down shift by manipulating the transmission control input device 9, the control so as to avoid a transmission gear down shift is aborted.

Preferably, if upon the registration S108 of the decrease of the demanded torque, a request to activate the wheel brakes 114 is registered, the control S109 of the engine rotational speed so as to not be below the rotational speed threshold value is omitted or terminated.

Further, if upon the registration S1, S108 of the decrease of the demanded torque, an activation of the kickdown function of the engine control input device 8 is registered, the transmission is controlled S111 so as to obtain a transmission gear down shift.

It should be noted that a large number of variations to the method described with reference to FIG. 4 are possible. For example, instead of a gradual increase of the engine rotational speed threshold value, the method may comprise omitting or terminating the step of controlling S109 the engine rotational speed so as to not be below the rotational speed threshold value if the road inclination is below an inclination threshold value.

Above the control S109 of the engine rotational speed so as to not be below the rotational speed threshold value is described as enabled in dependence on the operational condition of a manipulation of a driver control input device, i.e. a manipulation of the transmission control input device 9 for the transmission to be in the off-road gear strategy mode. In addition or alternatively, the operational condition, upon which the control S109 of the engine rotational speed so as to not be below the rotational speed threshold value is enabled, may be an indication of an increased tendency for a wheel of the vehicle to slip. Such a tendency may be due to a reduced stability of a surface on which the vehicle is travelling, e.g. where the surface is a surface of gravel, mud, snow or ice. The tendency may be detected e.g. by comparing input from a wheel speed sensor with information about the vehicle speed.

In some embodiments, the control S109 of the engine rotational speed so as to not be below the rotational speed threshold value is permanently enabled.

It is to be understood that the present invention is not limited to the embodiments described above and illustrated in the drawings; rather, the skilled person will recognize that many changes and modifications may be made within the scope of the appended claims.

The invention claimed is:

1. A method for controlling a vehicle with an internal combustion engine and a transmission, the transmission being arranged to automatically provide shifts between a plurality of gear ratios between the engine and at least one driven wheel of the vehicle, characterized by the steps of: registering a decrease of a demanded torque from an engine control input device of the vehicle, controlling in response to the demanded torque decrease a rotational speed of the engine so as to not be below a rotational speed threshold value which is above an idle speed of the engine, and where said rotational speed threshold value is determined so as for a transmission gear down shift to be avoided.

2. A method according to claim 1, wherein said control of the engine rotational speed so as to not be below the rotational speed threshold value is dependent on an inclination of a road on which the vehicle is travelling.

3. A method according to claim 2, further comprising omitting or terminating the step of controlling the engine rotational speed so as to not be below the rotational speed threshold value if the road inclination is below an inclination threshold value.

4. A method according to claim 1, further comprising determining the rotational speed threshold value in dependence on an inclination of a road on which the vehicle is travelling.

5. A method according to claim 4, further comprising increasing the rotational speed threshold value with an increasing road inclination.

6. A method according to claim 2, further comprising determining the inclination by means of an inclination sensor.

7. A method according to claim 1, wherein said control of the engine rotational speed so as to not be below the rotational speed threshold value is dependent on a weight of the vehicle.

8. A method according to claim 1, further comprising determining the rotational speed threshold value in dependence on a weight of the vehicle.

9. A method according to claim 1, further comprising enabling in dependence on an operational condition of the vehicle the control of the engine rotational speed so as to not be below the rotational speed threshold value.

10. A method according to claim 9, wherein the operational condition is a manipulation of a driver control input device.

11. A method according to claim 9, wherein the operational condition is that the transmission is in an off-road gear strategy mode.

12. A method according to claim 9, wherein the operational condition is an indication of an increased tendency for a wheel of the vehicle to slip.

13. A method according to claim 9, further comprising activating a driver alert signal upon enabling the control of the engine rotational speed so as to not be below the rotational speed threshold value.

14. A method according to claim 1, further comprising determining the rotational speed threshold value in dependence on a maximum torque of the engine.

15. A method according to claim 1, further comprising registering, upon the registration of the decrease of the demanded torque, a request by a vehicle driver transmission control input device to perform a down shift of transmission gear, and controlling the transmission so as to obtain the requested down shift of transmission gear.

16. A method according to claim 1, further comprising registering, upon the registration of the decrease of the demanded torque, a request to activate at least one wheel brake of the vehicle, and, upon the registration of the wheel brake activation request, omitting or terminating the step of controlling the engine rotational speed so as to not be below the rotational speed threshold value.

17. A method according to claim 1, further comprising registering, upon the registration of the decrease of the demanded torque, an activation of a kickdown function of the engine control input device, and, upon the registration of the kickdown function activation, controlling the transmission so as to obtain a down shift of transmission gear.

18. A computer program comprising program code means for performing the steps of claim 1 when said program is run on a computer.

19. A computer readable medium carrying a computer program comprising program code means for performing the steps of claim 1 when said program product is run on a computer.

20. A control unit for controlling an internal combustion engine and a transmission of a vehicle, the control unit being configured to perform the steps of the method according to claim 1.

21. A vehicle comprising a control unit according to claim 20.

* * * * *